(12) United States Patent
Smith et al.

(10) Patent No.: US 11,010,145 B1
(45) Date of Patent: May 18, 2021

(54) RETARGETABLE COMPILATION FOR QUANTUM COMPUTING SYSTEMS

(71) Applicant: Rigetti & Co, Inc., Berkeley, CA (US)

(72) Inventors: Robert Stanley Smith, Emeryville, CA (US); Eric Christopher Peterson, Berkeley, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 0 days.

(21) Appl. No.: 16/281,808

(22) Filed: Feb. 21, 2019

Related U.S. Application Data

(60) Provisional application No. 62/633,443, filed on Feb. 21, 2018.

(51) Int. Cl.
*G06F 8/41* (2018.01)
*G06N 10/00* (2019.01)
*G06F 8/10* (2018.01)

(52) U.S. Cl.
CPC .......... *G06F 8/47* (2013.01); *G06F 8/10* (2013.01); *G06N 10/00* (2019.01)

(58) Field of Classification Search
CPC ..... G06F 8/47; G06F 8/41; G06F 8/40; G06F 8/10; G06N 10/00
See application file for complete search history.

(56) References Cited

U.S. PATENT DOCUMENTS

| | | | |
|---|---|---|---|
| 8,175,995 B2 | 5/2012 | Amin | |
| 9,430,264 B2 | 8/2016 | Tang et al. | |
| 9,537,953 B1 | 1/2017 | Dadashikelayeh et al. | |
| 9,660,859 B1 | 5/2017 | Dadashikelayeh et al. | |
| 9,858,531 B1 | 1/2018 | Monroe et al. | |
| 9,870,273 B2 | 1/2018 | Dadashikelayeh et al. | |
| 10,223,084 B1 * | 3/2019 | Dunn | G06N 10/00 |
| 10,454,459 B1 * | 10/2019 | Cohen | H03K 19/195 |
| 10,592,216 B1 * | 3/2020 | Richardson | G06F 8/60 |

(Continued)

FOREIGN PATENT DOCUMENTS

| | | |
|---|---|---|
| CN | 104880476 A | 9/2015 |
| WO | WO 2015/178992 A2 | 11/2015 |

(Continued)

OTHER PUBLICATIONS

Robert Tucci, "Quibbs, a Code Generator for Quantum Gibbs Sampling" (Year: 2010).*

(Continued)

*Primary Examiner* — Phillip H Nguyen
(74) *Attorney, Agent, or Firm* — Fenwick & West LLP

(57) ABSTRACT

A compiler translates programs for execution on a quantum processing system. To facilitate portability of quantum programs across differently configured quantum processors, the compiler accepts a specification of the quantum processor as input along with a quantum program for compilation. A specification may include information about the type of each qubit device in the quantum processor, the number of qubits, the qubit topology, coherence times of individual qubits, and operations that the quantum processor supports. The compilation process may include manipulating operations of the input program to generate equivalent operations that can be performed by the quantum gates and qubit devices on the quantum processor for which the program is being compiled.

20 Claims, 5 Drawing Sheets

(56) References Cited

U.S. PATENT DOCUMENTS

| | | | |
|---|---|---|---|
| 2003/0121028 A1* | 6/2003 | Coury | B82Y 10/00 717/138 |
| 2003/0169041 A1* | 9/2003 | Coury | B82Y 10/00 324/307 |
| 2005/0038753 A1 | 2/2005 | Yen et al. | |
| 2005/0273306 A1 | 12/2005 | Hilton et al. | |
| 2006/0101236 A1 | 5/2006 | Han | |
| 2007/0162262 A1 | 7/2007 | Tucci | |
| 2007/0239366 A1 | 10/2007 | Hilton et al. | |
| 2007/0294070 A1 | 12/2007 | Yamashita | |
| 2008/0313114 A1 | 12/2008 | Rose | |
| 2008/0313430 A1 | 12/2008 | Bunyk | |
| 2009/0014714 A1 | 1/2009 | Koch | |
| 2009/0259905 A1 | 10/2009 | Silva et al. | |
| 2010/0217850 A1 | 8/2010 | Ferris | |
| 2010/0325276 A1 | 12/2010 | Aarni et al. | |
| 2011/0238378 A1 | 9/2011 | Allen et al. | |
| 2012/0054771 A1 | 3/2012 | Krishnamurthy et al. | |
| 2012/0254586 A1 | 10/2012 | Amin et al. | |
| 2013/0239176 A1 | 9/2013 | Terris et al. | |
| 2013/0311990 A1 | 11/2013 | Tang et al. | |
| 2014/0063027 A1 | 3/2014 | Becker | |
| 2014/0082066 A1 | 3/2014 | Inui | |
| 2014/0173150 A1 | 6/2014 | Yu | |
| 2014/0229722 A1 | 8/2014 | Harris | |
| 2014/0297708 A1 | 10/2014 | Svore et al. | |
| 2015/0046681 A1 | 2/2015 | King | |
| 2015/0089505 A1 | 3/2015 | Malaiyandisamy et al. | |
| 2015/0269124 A1 | 9/2015 | Hamze et al. | |
| 2015/0358022 A1 | 12/2015 | McDermott et al. | |
| 2016/0182397 A1 | 6/2016 | Mcfarlin et al. | |
| 2016/0267032 A1 | 9/2016 | Rigetti et al. | |
| 2016/0283857 A1* | 9/2016 | Babbush | G06N 10/00 |
| 2016/0328659 A1 | 11/2016 | Mohseni et al. | |
| 2017/0075734 A1 | 3/2017 | Raman | |
| 2017/0177534 A1 | 6/2017 | Mohseni et al. | |
| 2017/0179960 A1 | 6/2017 | Hastings et al. | |
| 2017/0223094 A1 | 8/2017 | Johnson et al. | |
| 2017/0223143 A1 | 8/2017 | Johnson et al. | |
| 2017/0255872 A1 | 9/2017 | Hamze et al. | |
| 2017/0357539 A1 | 12/2017 | Dadashikelayeh et al. | |
| 2017/0357561 A1 | 12/2017 | Kelly | |
| 2018/0091440 A1 | 3/2018 | Dadashikelayeh et al. | |
| 2018/0113742 A1 | 4/2018 | Chung et al. | |
| 2018/0129966 A1 | 5/2018 | Kliuchnikov et al. | |
| 2018/0181685 A1 | 6/2018 | Roetteler et al. | |
| 2018/0189653 A1 | 7/2018 | Burchard | |
| 2018/0246848 A1 | 8/2018 | Douglass et al. | |
| 2018/0246851 A1 | 8/2018 | Zaribafiyan et al. | |
| 2018/0260245 A1 | 9/2018 | Smith | |
| 2018/0365585 A1* | 12/2018 | Smith | G06F 9/546 |
| 2019/0042264 A1* | 2/2019 | Zou | G06F 9/3818 |
| 2019/0042965 A1* | 2/2019 | Clarke | G06N 10/00 |
| 2019/0049495 A1 | 2/2019 | Ofek et al. | |
| 2019/0164059 A1 | 5/2019 | Denchev et al. | |
| 2019/0164076 A1* | 5/2019 | Kim | G06F 30/00 |

FOREIGN PATENT DOCUMENTS

| | | |
|---|---|---|
| WO | WO 2016/011440 A1 | 1/2016 |
| WO | WO 2017/214293 A1 | 12/2017 |

OTHER PUBLICATIONS

Metodi et al., "Design and implementation of a quantum compiler" (Year: 2010).*

Jeff Booth, "Quantum Compiler Optimizations" (Year: 2012).*

Metodi et al., "Scheduling physical operations in a quantum information processor" (Year: 2006).*

Venturelli et al., "Compiling quantum circuits to realistic hardware architectures using temporal planners" (Year: 2018).*

Paolo Zuliani, "Compiling quantum programs" (Year: 2005).*

Chong et al., "Programming languages and compiler design for realistic quantum hardware" (Year: 2017).*

Smith, R. S. et al., "A Practical Quantum Instruction Set Architecture," Rigetti & Co., Inc.—v2.0.20170217, Feb. 17, 2017, pp. 1-15.

Castelvecchi, D., "Quantum cloud goes commercial," Nature, vol. 543, Mar. 9, 2017, pp. 159.

Fu, X. et al., "A Heterogeneous Quantum Computer Architecture," ACM, May 2016, pp. 323-330.

Hornibrook, J.M. et al., "Cryogenic control architecture for large-scale quantum computing," arXiv: 1409.2202v1, Sep. 8, 2014, pp. 1-8.

PCT International Search Report and Written Opinion, PCT Application No. PCT/US2018/038359, dated Sep. 20, 2018, 12 pages.

Peruzzo, A. et al., "A variational eigenvalue solver on a quantum processor", ArXiv:1304.3061v1 [quanl-ph], Apr. 10, 2013, pp. 1-10.

United States Office Action, U.S. Appl. No. 15/917,317, dated May 20, 2020, 34 pages.

United States Office Action, U.S. Appl. No. 15/917,317, dated Oct. 31, 2019, 32 pages.

United States Third Party Submission, U.S. Appl. No. 15/917,317, dated Oct. 23, 2018, 43 pages.

* cited by examiner

RETARGETABLE COMPILATION FOR QUANTUM COMPUTING SYSTEMS

CROSS REFERENCE TO RELATED APPLICATIONS

This application claims the benefit of Provisional Application No. 62/633,443, filed Feb. 21, 2018, which is incorporated by reference in its entirety.

BACKGROUND OF THE INVENTION

1. Field of the Invention

This invention relates generally to quantum computing, and in particular to compiling instructions for quantum processors with different quantum architectures.

2. Description of the Related Art

A compiler may be configured to convert a computer program written in one programming language (sometimes called the source language) into a different programming language (sometimes called the target language), typically of equal or lower complexity and closer to a machine-executable format. Here, the phrase "programming language" may refer to a "high-level language" (e.g., Common Lisp, ML, JavaScript, Python, C, . . . ), a "low-level language" (e.g., assembly, bytecode, binary machine code . . . ), or to a specified subset of any such language (e.g., C without the use of explicit looping constructs). Bytecode refers to a binary format executable on virtual machines (e.g. Java Virtual Machine). Binary machine code refers to the ultimate execution target of classical processors; such code can be directly executed by a processor designed according to a specific instruction set architecture (ISA). Binary machine code is often described as being "native" to a specific ISA. Examples of ISAs include x86, AMD64, Alpha, Z80, and ARM®. A classical processing system is designed as an implementation of an ISA, and is thus configured to be able to implement all operations defined in the ISA. A compiler for such a system may be designed to translate programs into a particular machine code or to a subset thereof, and any computer with processors conforming to the ISA with which the machine code is associated can execute the program. Alternatively, if a machine conforms to an ISA for which a compiler exists which translates language X to that machine's native code, then a compiler converting language Y to language X may be used in conjunction to provide the effect of translating language Y to the machine's native code.

Unlike classical computing systems, gate-based superconducting quantum computers are primarily analog devices that require intermittent calibration to determine an effective operation state. Such calibrations may cause components of a quantum computer to change, and may affect whether certain operations can be performed by the quantum processor in different configurations. Additionally, a large number of possible configurations for quantum processors presents challenges to developing programs that are portable across multiple quantum systems. Consequently, a single static ISA cannot act as a reliable compilation target.

SUMMARY OF THE INVENTION

A compiler for a gate-based superconducting quantum computer can compile a quantum program for quantum processors with different configurations and/or different calibration settings. The compiler accepts as input both the quantum program, a specification describing the hardware configuration of the particular quantum processor for which the program is to be compiled, and calibration information about the current state of the quantum processor. The compiler uses information from the specification to translate the program into instructions in a target language—in some embodiments the instructions may be provided in machine code—that the particular quantum processor will be able to execute.

The specification includes information about the configuration of a quantum processor. The specification may also include information related to the calibration of the quantum processing system. For example, a specification may include a number of qubit devices in the quantum processor, identification of the types of each qubit, the coherence time of each qubit, topology of the qubit devices within the quantum processor, operations that the quantum processor supports, qubit device fidelity, operational fidelity of the quantum processing system, and identification of disabled qubit devices.

The compiler uses information from the specification to customize the instructions in a target language it produces for the quantum processing system. To achieve customization, the compiler may perform a process of gate realization to determine available gates in the quantum processor that can produce equivalent or near equivalent operations to gates that are used in the program logic. The compiler may also perform qubit routing to adjust relative locations of qubit states within the quantum processor. Additionally, the compiler may assign operations to qubits according to their individual coherence times and schedules qubit operations—for example giving priority to qubit devices with longer coherence times. Furthermore, the compiler may assign operations to qubits according to their individual gate fidelities and schedules qubit operations—for example giving priority to qubit devices with higher gate fidelities. The operation schedule may be included in instructions in a target language that is provided to the quantum processing system for execution.

BRIEF DESCRIPTION OF THE DRAWINGS

The invention has advantages and features which will be more readily apparent from the following detailed description of the invention and the appended claims, when taken in conjunction with the accompanying drawings, in which:

Figure 1:
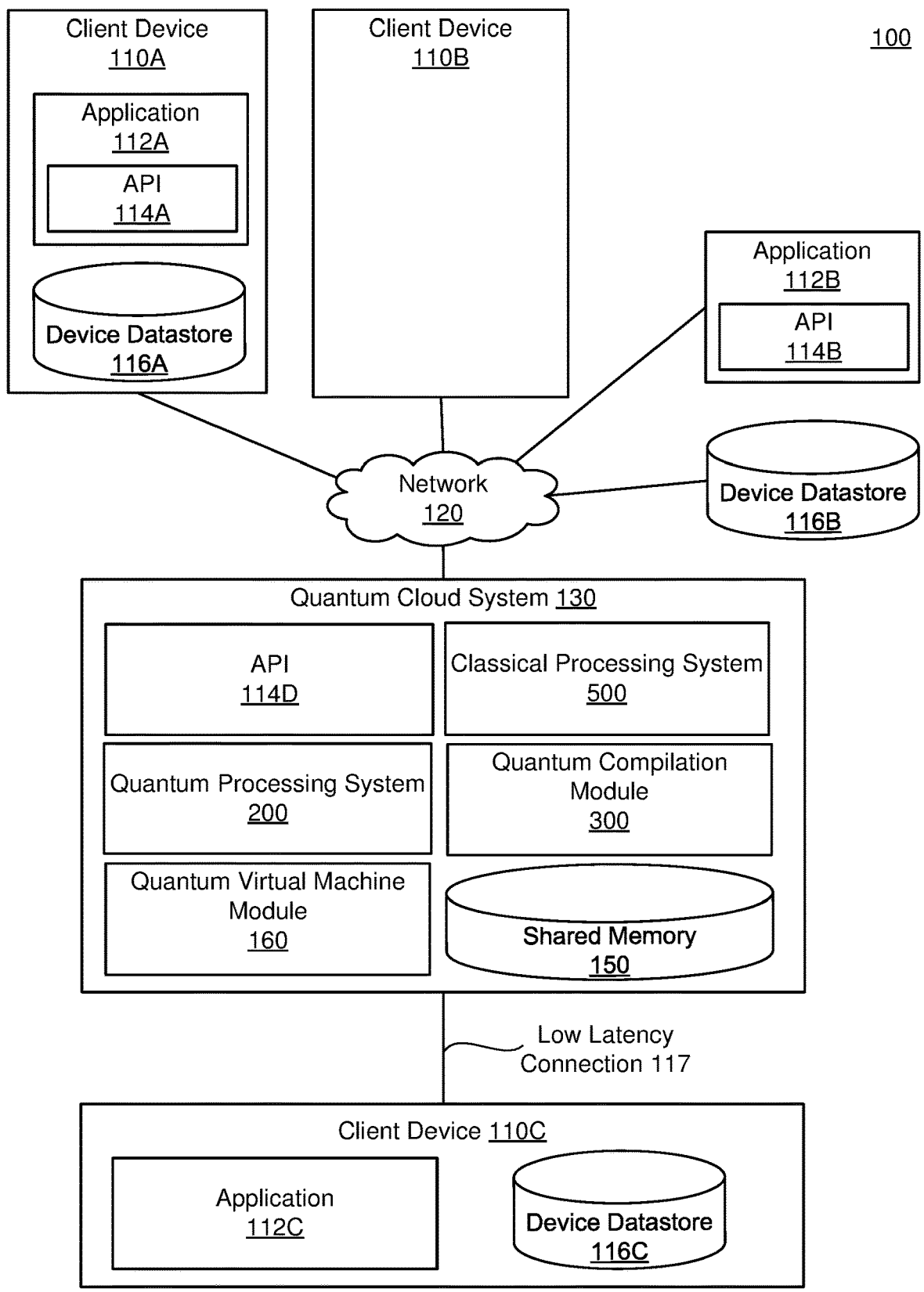
FIG. 1 is an illustration of a cloud quantum computing system, in accordance with an example embodiment.

The figures depict various embodiments for purposes of illustration only. One skilled in the art will readily recognize from the following discussion that alternative embodiments of the structures and methods illustrated herein may be employed without departing from the principles described herein.

It is noted that wherever practicable similar or like reference numbers may be used in the figures and may indicate similar or like functionality. This description occasionally uses reference numbers in combination with letters to designate items illustrated in the figures. Herein, a reference number used without an accompanying letter (e.g., "110") references any or all instances of the designated item, while a reference number used with an accompanying letter (e.g., "110A") refers to the specific item designated with that label in the figure.

DETAILED DESCRIPTION

Quantum computations are fundamentally different from classical computations. Real world computing applications rarely use solely quantum computations and are generally a hybridization of quantum and classical computations. However, executing quantum computations requires a highly specific set of hardware, and integrating the results of those quantum computations with classical systems is challenging.

Quantum algorithms, when executed, manipulate and read information stored in a quantum bit (i.e. qubit). A qubit is fundamentally different from a classical bit. A classical bit has two possible states, typically represented as a 0 or a 1. Ostensibly, a qubit also has two measurable outcomes which can likewise represented as a 0 or a 1. However, the state of a qubit is a superposition of the two measurable outcomes, i.e. some probability of a 0 state and some probability of a 1 state. Hence, a qubit can encode more information in its state than a classical bit.

The two measurable outcomes of a qubit are known as the basis states. The basis states can be written as $|0\rangle$ and $|1\rangle$. Accordingly, a qubit state is a linear superposition of the basis states. Thus, a qubit state $|\psi\rangle$ can be represented as a linear combination of $|0\rangle$ and $|1\rangle$: $|\psi\rangle = \alpha|0\rangle + \beta|1\rangle$, where $\alpha$ and $\beta$ are probability amplitudes of the basis states. Measurement of a qubit state is a measurement of the basis states $|0\rangle$ and $|1\rangle$ with probabilities $|\alpha|^2$ and $|\beta|^2$, respectively. Generally, direct measurement of the qubit alters the values of $\alpha$ and $\beta$.

Another dissimilarity between a qubit and a classical bit is that multiple qubits can demonstrate quantum entanglement. Quantum entanglement allows a qubit state to express correlation between a set of qubit states that is difficult or impossible to express between classical bits. As an example, the qubit state of two entangled qubits can be expressed as $|\psi\rangle = \gamma_{00}|00\rangle + \gamma_{01}|01\rangle + \gamma_{10}|10\rangle + \gamma_{11}|00\rangle$ where the $\gamma$ values are the probability amplitudes of the entangled states. Thus, multiple qubits can store more information in their states than an equivalent number of classical bits.

Generally, the quantum algorithms described herein are executed on a quantum computation system to encode information into a qubit state (or into the state of a group of qubits), manipulate the qubit state, and measure the qubit state.

Quantum computation systems can require recurring calibration, as hardware used for controlling and measuring qubit states can be highly sensitive to environmental changes. For example, variations in air pressure, humidity, and ambient temperature may affect the accuracy with which a system reads qubit values. Additionally, quantum computing systems can also have widely varying configurations. For example, two quantum computing systems may have differing numbers of qubits and the qubits may be arranged differently in each case. Such possibilities for variation in quantum computing systems makes it difficult for one program to be portable across many quantum computing systems.

To make it possible for differently configured quantum computing systems to execute the same program, details about the configuration of a quantum computer are provided to a compiler along with the program ahead of compilation. Such a specification describing details about a quantum computing system may include general information about the system's configuration (e.g., type of qubits, number of qubits, qubit topology, and operations supported by the system), and information about current capabilities of the system, as determined based on a most recent calibration of the system (e.g., qubit coherence times, qubit device fidelity, operational fidelity of the system, identification of disabled qubit devices). The compiler uses the provided information about the quantum computing system to establish a compilation target (i.e., a set of operations supported by the current configuration of the quantum system to which to translate the program) and compiles the program using operations that are executable by the quantum system.

FIG. 1 is an illustration of a cloud quantum computing system, in accordance with an example embodiment. Execution of quantum algorithms via a quantum computation system requires a complex set of computational hardware that is typically inaccessible to the general population. However, the described computing environment allows for the remote control and execution of quantum algorithms using a network based quantum computation system. As an example, FIG. 1 is a block diagram of a system environment 100 for a quantum computation system, such as a quantum cloud system 130, which can provide the results of quantum computations to client devices remote from the quantum cloud system 130. The system environment 100 of FIG. 1 includes client devices 110, a network 120, and a quantum cloud system 130. Alternate embodiments of the system environment can include any number of client devices 110 and quantum cloud systems 130. The functions performed by the various entities of FIG. 1 may vary in different embodiments.

Within the context of the environment 100 shown in FIG. 1, a user of a client device 110 may generate a set of quantum calculation instructions using an application 112 executing on the client device 110, or using an application 112 executing on a separate machine that is accessed by the client device 110. In some embodiments, the quantum calculation instructions can be written in a defined quantum instruction language (e.g., Quil, see "*A Practical Quantum Instruction Set Architecture*," arXiv:1608.03355v2) as a quantum algorithm. As described herein, a quantum algorithm can include any computer executable representation of quantum instructions, a series of quantum computations, hardware commands, software commands, or control signals. Additionally, a quantum algorithm can include any number of classical calculation instructions.

The implementation or execution of the quantum algorithm by the quantum cloud system 130 includes the determination of at least one result of a quantum operation (e.g., reading a qubit or multiple qubits). The client device 110 transmits the quantum algorithm to the quantum cloud system 130. The quantum cloud system 130 receives the quantum algorithm, schedules instructions of the quantum algorithm on the quantum cloud system 130, and executes the quantum algorithm on the quantum cloud system 130. The quantum cloud system 130 determines the result of the quantum algorithm by executing the quantum algorithm using the classical processing system 500, the quantum processing system 200, or the quantum virtual machine module 160 (or any combination of the systems). In various other embodiments, the quantum cloud system 130 can access any other computational resource to execute the quantum algorithm (e.g., a supercomputer or other high-performing computer resource). Accordingly, the quantum cloud system 130 transmits the determined result of the quantum algorithm to the client device 110.

This hybridization of classical processing and quantum processing allows for direct integration of quantum computations and classical computations into a familiar classical computer program framework. Executing quantum calculations on a classical system, or classical calculations on a quantum system, is non-ideal. Thus, the hybrid quantum cloud system allows for leveraging the performance advantages of quantum and classical computations into a single system.

Further, the quantum cloud system 130 can receive any number of quantum algorithms from any number of client devices 110 in the environment. Additionally, the quantum cloud system 130 includes functionality to execute quantum algorithms received from disparate client devices 110 such that the quantum algorithms are executed efficiently.

In the environment of FIG. 1, client devices 110 are any device that can access the functionality of the quantum cloud system 130. In some configurations, client devices 110 are classical computing devices adapted to execute classical computer programs. A typical client device 110 can be a lap-top computer, tablet, or cell-phone, or any other type of access node. In one embodiment, a client device 110A may include software applications 112, such as application 112A, which execute on the processor of the respective client device 110. In one example, the application 112 can be a programming application, such as an integrated development environment, configured to program quantum processing systems. The application 112 can generate a quantum algorithm for determining the result of a quantum calculation on the quantum cloud system 130. Thus, client devices 110 may generate a quantum algorithm that uses quantum calculations in the context of a classical application.

In various embodiments, an application 112 can be a web browser, a word processor, a networking application, a messaging application, etc. Additionally, the client applications 112 can communicate with one another and with quantum cloud system 130 via the network 120. In some embodiments, each application 112 can be linked to a user account on the quantum cloud system 130 associated with a client device 110, the client device user, or group of client device users.

In one embodiment, as depicted in FIG. 1 by client device 110B, the application 112B may not be stored locally by the client device 110B. The application 112B may be stored on the cloud or another remote server. For example, the client device 110B may access the application 112B via the network 120. In another embodiment, the client device 110C, which may include application 112C, may be on a server that is in close proximity to the quantum processing system 200, where the client device 110C is connected to the quantum cloud system 130 by a low latency connection 117. It should be noted that although the connection 117 is low-latency in the embodiment of FIG. 1, in practice, the connection may be any latency.

In some cases, an application 112 uses an application programming interface (API) 114 to communicate with the quantum cloud system 130 through the network 120. In various embodiments, the API 114 may be stored locally on the client device 110, such as API 114A on client device 110A, or may be accessed over the network 120 such as how client device 110B may access API 114B. In other embodiments the API 114 may be on the quantum cloud system 130—see API 114D. The API can expose the application 112 to a quantum machine instruction library. The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by quantum algorithms. In some examples, the API is configured to allow the application 112 to generate quantum algorithms that control both the classical processing system and quantum processing system using the quantum machine instruction library.

Additionally, the client device 110 may include a device datastore 116. The device datastore 116 contains information associated with the device user, the client device 110, a user account, client application and application specific data, such as data and variables used by or related to the quantum algorithms. This information can be accessed by an application 112 when generating or transmitting a quantum algorithm to the quantum cloud system 130. In one embodiment, the information can be used to build, store, modify, or update user profiles. The information stored in the device data store can include: inter-device security metrics, intra-device security metrics, network security metrics, authentication protocols, user account information and preferences, client device information and preferences, device user information and preferences, a record of preferences and changes, location based information, identities of applications or other application information executing on the client device, and any other information associated with executing quantum algorithms in the environment. In some embodiments, an access node can store a local copy of the quantum machine instruction library in a device data store 116.

As with the application 112, the device datastore 116 may be stored locally on a client device 110A, as depicted by device datastore 116A, or the device datastore may be stored on the cloud, as depicted by device datastore 116B, or on another remote server. For example client device 110B may access the device datastore 116B via the network 120. In another embodiment, the client device 110C, which may include device datastore 116C, may be on a server that is in close proximity to the quantum processing system 200, where the client device 110C is connected to the quantum cloud system 130 by a low latency connection 117.

Continuing with FIG. 1, the client devices 110 communicate with the quantum cloud system 130 via the network 120, which may include any combination of local area and wide area networks employing wired or wireless communication links. In some embodiments, all or some of the communication on the network 120 may be encrypted or subject to security settings within the environment. In some examples, a client device 116 can be directly connected to and communicate directly with the quantum cloud system 130.

The quantum cloud system 130 receives, interprets, and executes the quantum algorithm from a client device 110. In some examples, a user generates the quantum algorithm on a client device 110 and transmits the quantum algorithm to the quantum cloud system 130. After execution, the quantum cloud system 130 transmits the result of the quantum algorithm to the client device 110. In the example embodiment of FIG. 1, the quantum cloud system 130 includes a quantum processing system 200, a classical processing system 500, a quantum virtual machine module (QVM) 160, a quantum compilation module 300, and a shared memory 150.

The quantum cloud system 130 includes a number of systems and modules, which refers to hardware components and/or computational logic for providing the specified functionality. That is, a system or module can be implemented in hardware elements, firmware, and/or software (e.g., a hardware server comprising computational logic, or computer storage medium comprising computational logic). Other embodiments can include additional systems and modules, can distribute functionality between systems and modules, and can attribute functionality to more or fewer systems or modules. Note that, in general, quantum processing systems and modules of the quantum cloud system 130 require specialty quantum hardware, some of which is described herein. Further, some modules of the quantum cloud system 130 are designed for control of the specialty quantum hardware systems.

The quantum cloud system includes a classical processing system 500. The classical processing system 500 is described in more detail in the description of FIG. 5. The classical processing system 500 receives a quantum algorithm from a client device 110 and generates a set of algorithm instructions to implement the quantum algorithm on the quantum processing system 200. The quantum cloud system 130 compiles and executes the algorithm instructions to determine the result of the quantum algorithm and returns the result of the quantum algorithm to the client device 110. In one embodiment, the classical processing system 500 determines the set of algorithm instructions based on the quantum instruction language (e.g., Quil) of the received quantum algorithm and the quantum machine instruction library.

Because the quantum algorithm is executing on quantum cloud system 130, which includes both classical and quantum computing systems, the set of algorithm instructions can likewise include both classical instructions and quantum instructions. Accordingly, the quantum algorithm can be viewed as a quantum/classical algorithm (i.e., a "hybrid algorithm"). The classical instructions are instructions of the hybrid algorithm that execute on the classical processing system 500. Similarly, the quantum instructions are instructions of the algorithm that execute on the quantum processing system 200.

The classical processing system 500 can schedule the algorithm instructions on elements of the quantum cloud system 130. Scheduling algorithm instructions defines an order of execution for the algorithm instructions across the elements of the quantum cloud system 130. Generally, the algorithm instructions are scheduled such that the classical instructions and quantum instructions operate on their respective systems in a manner that efficiently determines the result of the quantum algorithm on the quantum cloud system 130.

Algorithm instructions can be scheduled by the quantum cloud system 130 in a variety of manners. As a basic example, the classical processing system 500 may schedule two classical instructions for execution on the classical processing system 500 and a single quantum instruction for execution on the quantum processing system 200, followed by three classical instructions on the classical processing system 500, etc. In another example, the quantum instructions can be scheduled and executed on the quantum virtual machine module 160. In another embodiment, the classical processing system 500 directly schedules the quantum instructions on the quantum processing system 200. In another embodiment, executing a classical instruction may initiate the scheduling and execution of a quantum instruction on the quantum processing system 200.

Further, the scheduled algorithm instructions can be executed by the quantum cloud system 130 in a variety of manners. Using the previous example, the quantum cloud system may execute the two classical instructions, then the quantum instruction, then the three classical instructions, etc. In some embodiments, the algorithm instructions are executed based on a system clock of the quantum cloud system 130 (e.g., each instruction executes at a specific time). In another embodiment, the algorithm instructions execute sequentially (e.g., a first instruction, a second instruction, etc.). In another embodiment, the classical processing system 500 can schedule classical and quantum operations, or multiple quantum operations, to execute simultaneously on their respective systems.

Whatever the embodiment, the classical processing system 500 may schedule algorithm instructions in any manner across any of the systems and modules of the quantum cloud system 130 such that, when executed, the algorithm instructions determine the result of the quantum algorithm.

Referring again to FIG. 1, the quantum cloud system 130 includes a quantum processing system 200. The quantum processing system 200 is described in more detail in a description of FIG. 2. The quantum processing system 200 is configured to execute quantum operations to facilitate determining the result of the quantum algorithm. For example, the quantum processing system 200 receives scheduled quantum instructions from the classical processing system 500 and executes the quantum instructions. In another example, the quantum processing system 200 receives and executes a quantum instruction as a result of the classical processing system 500 executing a classical instruction. Generally, the quantum processing system 200 stores the result of the quantum computation in the shared memory 150. In some embodiments, the quantum processing system 200 returns the result of the quantum computation to the classical processing system 500.

The quantum cloud system 130 also includes a shared memory 150. The shared memory 150 stores information that can be used by any system or module of the quantum cloud system 130 to facilitate determining the result of a quantum algorithm (e.g., the quantum processing system 200 and the classical processing system 500). In a particular example, the shared memory 150 stores the result of executed quantum computations by the quantum processing system 200, which are then directly accessible by the classical processing system 500. As noted above, the algorithm instructions can include information stored in the shared memory 150 of the quantum cloud system 130. For example, the shared memory 150 can store a rotation angle as an input parameter that a quantum instruction can access and apply to a qubit when executing. As another example, the shared memory 150 can store the results of two previously executed quantum operations which a classical instruction can multiply using the classical processing system 500.

In some embodiments, the quantum cloud system 130 includes a quantum virtual machine module 160. The quantum virtual machine module 160 is a classical system configured to simulate quantum calculations (such as those performed by the quantum processing system 200). That is, the quantum virtual machine module 160 simulates quantum instructions on traditional computer architectures to simulate quantum operations and results. As such, the quantum virtual machine module 160 can receive quantum instructions from the classical processing system 500. The quantum virtual machine module 160 executes the quantum instructions and returns the result to the classical processing system 500 or stores the result in shared memory 150.

In some embodiments, the quantum cloud system 130 includes a quantum compilation module 300. The quantum compilation module 300 comprises a compiler that can compile instructions that the classical processing system 500 has scheduled for execution on the quantum processing system 200 into machine readable instructions for the quantum processing system 200. In particular, the quantum compilation module 300 determines an appropriate compilation target from information about a given specification of quantum hardware. A system administrator of the quantum cloud system 130 may update quantum hardware specifications associated with the quantum processing system 200. For example, a system administrator may update quantum hardware specifications to compile the program for a new version of the quantum processing system 200. As another example, a system administrator could update the quantum hardware specifications whenever the hardware for the quantum processing system 200 is calibrated. Quantum hardware specifications may be stored in shared memory 150. In some embodiments, quantum hardware specifications may be transmitted to the quantum cloud system 130 from a client device 110, for example, in conjunction with a quantum algorithm. The quantum compilation module 300 compiles the program and sends the resulting instructions in a target language (e.g., machine code) to the quantum processing system 200 for execution. Additional information about the quantum compilation module 300 is included in the descriptions of FIG. 3 and FIG. 4.

Furthermore, although examples presented herein describe a quantum compilation module 300 in the system environment 100 of a quantum cloud system 130, in some embodiments, the quantum compilation module 300 may compile quantum programs for arbitrary quantum systems. In one example embodiment, a quantum compilation module 300 may compile quantum programs for a standalone quantum processing system 200. In other embodiments, a quantum compilation module 300 may also be configured to compile quantum programs on a standalone classical processing system 500, or another system, for later execution by a quantum processor.

Providing a more contextual example of the environment 100, consider a researcher working to understand the dynamics of protein folding in a biological environment. The researcher generates computer code modeling protein folding using a hybrid classical/quantum algorithm including several classical and quantum calculations. The code is generated on a client device 110 using an application 112 with an installed API 114 configured to generate code using a quantum programming language, such as the Quil programming language. The researcher transmits the code to the quantum cloud system 130 via the network 120.

The quantum cloud system 130 receives the code and the classical processing system 500 generates a set of algorithm instructions, including both classical instructions and quantum instructions, based on the code. The classical processing system 500 then schedules the algorithm instructions such that the result of the code can be determined. For example, the classical processing system 500 schedules the classical operations on the classical processing system 500, (optionally) some of the quantum instructions on the quantum virtual machine module 160, and the remainder of the quantum instructions on the quantum processing system 200. The quantum compilation module 300 compiles the instructions scheduled for execution on the quantum processing system 200, according to the configuration specified by a given quantum hardware specification. The compiled object code includes operations that the quantum hardware of the quantum processing system 200 can execute in its current state. In this example, the quantum processing system 200 executes the quantum instructions and stores the result in the shared memory 150.

In aggregate, the algorithm instructions executed across the systems and modules of the quantum cloud system 130 determine a result to the protein folding code. Once determined, the quantum cloud system 130 transmits the result to the client device 110 via the network 120 so that the researcher can view the results of the protein folding calculation.

Figure 2:
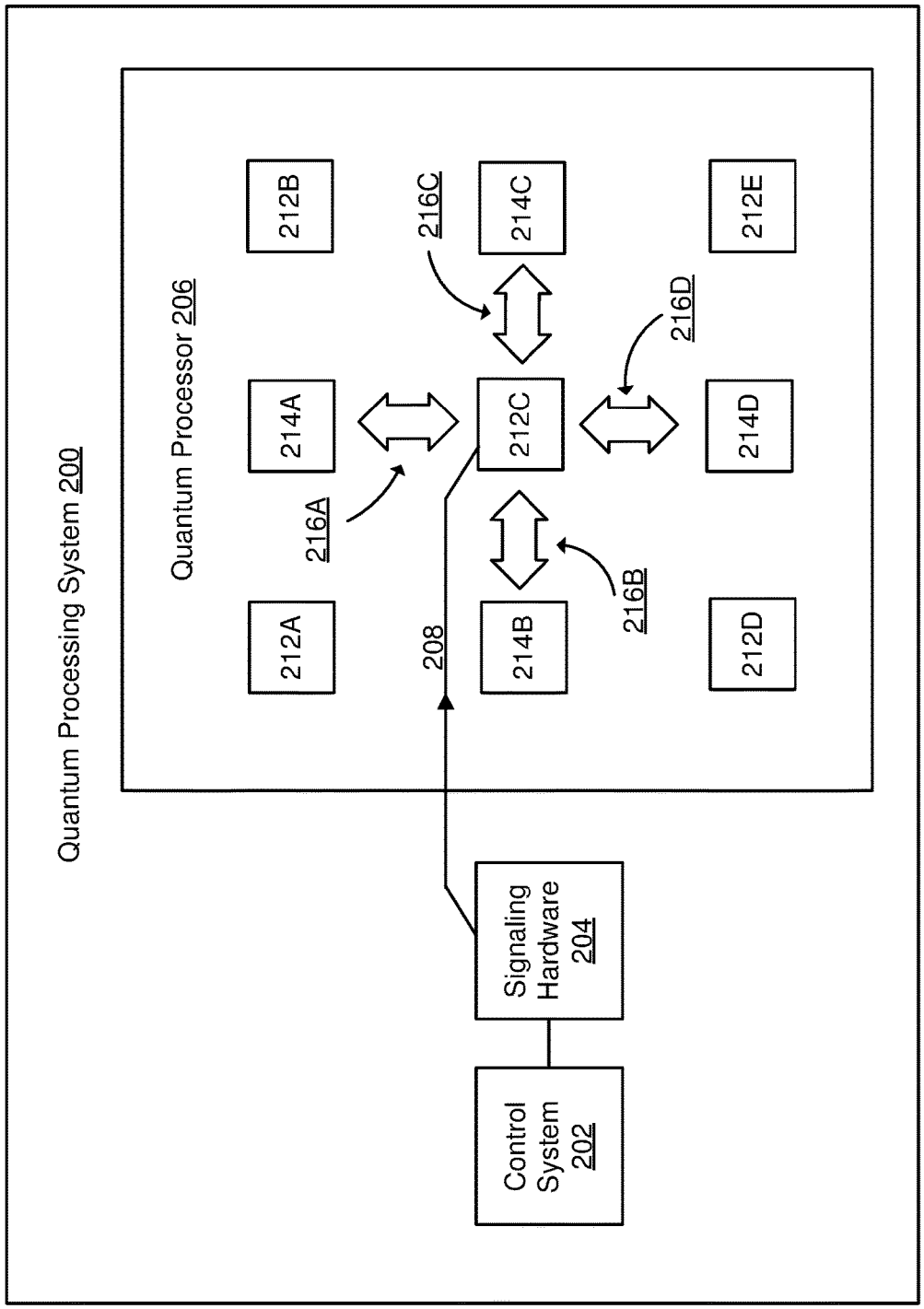
FIG. 2 is an illustration of a quantum processing system, in accordance with an example embodiment.

FIG. 2 is a block diagram showing devices and interactions in an example quantum processing system 200 of the quantum cloud system 130. As shown in FIG. 2, the example quantum processing system 200 includes a control system 202, signaling hardware 204, and a quantum processor 206. The quantum processing system 200 may include additional or different features, and the components may be arranged in another manner.

The example quantum processor 206 includes a qubit device array, which includes qubit devices arranged in a two-dimensional or three-dimensional lattice structure (or any other manner of interconnected structure). Nine of the devices in the qubit device array are shown in FIG. 2. In particular, FIG. 2 shows five tunable qubit devices 212 and four other qubit devices 214. In some examples, the tunable qubit devices are implemented as tunable transmon qubit devices, flux qubit devices, flatsonium qubit devices, fluxonium qubit devices, or other types of tunable devices. In some examples, the other qubit devices 214 are also implemented as tunable qubit devices. In some examples, the other qubit devices 214 are implemented as fixed-frequency qubit devices. For instance, other qubit devices 214 may be implemented as fixed-frequency transmon devices or other types of fixed-frequency qubit devices. The devices shown in FIG. 2 may be implemented by other types of devices or components. As an example, one or more of the qubit devices shown in FIG. 2 may be implemented as a resonator device, a coupler device, or otherwise.

In some instances, all or part of the quantum processor 206 functions as a quantum processor, a quantum memory, or another type of subsystem. In some examples, the quantum processor 206 includes a quantum circuit system. The quantum circuit system may include qubit devices, resonator devices and possibly other devices that are used to store and process quantum information. In some cases, the quantum processor 206 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor 206. In some cases, the quantum processor 206 includes an ion trap system, and the qubit devices are implemented as trapped ions controlled by optical signals delivered to the quantum processor. In some cases, the quantum processor includes a spin system, and the qubit devices are implemented as nuclear or electron spins controlled by microwave or radio-frequency signals delivered to the quantum processor 206. The quantum processor 206 may be implemented based on another physical modality of quantum computing.

In the example shown in FIG. 2, the devices are arranged in a rectilinear (e.g., rectangular or square) array that extends in two spatial dimensions, and each qubit device has four nearest-neighbor qubit devices. In some implementations, the devices can be arranged in another type of ordered or unordered array (e.g., a hexagonal lattice, a ring, an unordered random array, etc.). In some instances, the rectilinear array also extends in a third spatial dimension to form a cubic array or another type of three-dimensional array. In some configurations, a third spatial dimension may also include components configured for signal delivery, or to enable interaction of distant qubits through an extra layer of signal delivery. Signal delivery in the third dimension can allow non-proximally located qubits to interact. Further, qubit devices that have the ability to interact with each other directly are sometimes referred to herein as adjacent qubit devices. More broadly, the quantum processor 206 may include additional devices, including additional qubit devices, readout resonators, chip parametric amplifiers, any type of interconnects, superconducting vias, etc.

The control system 202 interfaces with the quantum processor 206 via a signal system that includes signal generation and connection hardware elements, e.g. signaling hardware 204. For example, the signaling hardware 204 elements can include signal lines, signal processing hardware, filters, feedthrough devices (e.g., light-tight feedthroughs, etc.), and other types of components.

In some implementations, the quantum processing system 200 can process quantum information by applying control signals (e.g., signals 208) to the qubits (e.g., qubits 212 and 214) in the quantum processing system 200. The control signals 208 can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

Signaling hardware 204 includes components that communicate with the quantum processing processor 206. The signaling hardware 204 may include, for example, waveform generators, amplifiers, digitizers, high-frequency sources, DC sources, AC sources and other type of components. The signal hardware may include additional or different features and components. In the example shown, components of the signaling hardware 204 are adapted to interact with the quantum processor 206. For example, the signaling hardware 204 can be configured to operate in a particular frequency range, configured to generate and process signals in a particular format, or the hardware may be adapted in another manner.

In some instances, one or more components of the signaling hardware 204 generate signals 208, for example, based on control information from control system 202. The signals can be delivered to the quantum processor 206 to operate the quantum processing system 200. For instance, the signaling hardware 204 may generate signals 208 to implement quantum logic operations, readout operations or other types of operations. As an example, the signaling hardware 204 may include arbitrary waveform generators (AWGs) that generate electromagnetic waveforms (e.g., microwave or radio-frequency) or laser systems that generate optical waveforms. The waveforms or other types of signals 208 generated by the signaling hardware 204 can be delivered to devices in the quantum processor 206 to operate qubit devices, readout devices, bias devices, coupler devices or other types of components in the quantum processing system 200.

In some instances, the signaling hardware 204 receives and processes signals from the quantum processor 206. The received signals can be generated by operation of the quantum processing system 200. For instance, the signaling hardware 204 may receive signals 208 from the devices in the quantum processor 206 in response to readout or other operations performed by the quantum processor 206. Signals 208 received from the quantum processor 206 can be mixed, digitized, filtered, or otherwise processed by the signaling hardware 204 to extract information, and the information extracted can be provided to the control system 202 or handled in another manner. In some examples, the signaling hardware 204 may include a digitizer that digitizes electromagnetic waveforms (e.g., microwave or radio-frequency) or optical signals, and a digitized waveform can be delivered to the control system 202 or to other signal hardware components. In some instances, the control system 202 processes the information from the signaling hardware 204 and provides feedback to the signaling hardware 204; based on the feedback, the signaling hardware 204 can in turn generate new control signals that are delivered to the quantum processor 206.

In some implementations, the signaling hardware 204 includes signal delivery hardware that interfaces with the quantum processor 206. For example, the signaling hardware 204 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor 206. In some instances, signal delivery hardware performs preprocessing, signal conditioning or other operations on readout signals received from the quantum processor 206.

Control system 202 communicates with the signaling hardware 204 to control operation of the quantum processing system 200. The control system 202 may include digital computing hardware that directly interfaces with components of the signaling hardware 204. In various embodiments, the control system 202 can include features similar to classical processing system 500. That is, control system 202 may include processors, memory, clocks and other types of systems or subsystems.

Generally, the control system 202 can interpret the quantum instructions generated by classical processing system 500 and generate a hardware-specific control sequences configured to execute the operations proscribed by the quantum machine instructions. For example, the control system 202 may generate control information that is delivered to the signaling hardware 204 and converted to control signals that control the quantum processor 206.

Control system 202 can include one or more clocks that can assist in scheduling quantum operations. For example, operations performed by the control system 202 may be scheduled for execution over a series of clock cycles, and clock signals from one or more clocks can be used to control the relative timing of each operation or groups of operations. In some cases, the control system 202 schedules control operations according to quantum instructions generated from a quantum (or hybrid) algorithm, and the control information is delivered to the signaling hardware 204 according to the schedule in response to clock signals from a clock or other timing system.

In some embodiments, control system 202 can execute classical computer program instructions (e.g., instructions formatted as software, firmware, or otherwise). For example, the control system 202 may execute a quantum processor unit 206 (QPU) driver software, which may include machine code compiled from any type of programming language (e.g., Python, C++, etc.) or instructions in another format. In some cases, QPU driver software receives quantum instructions (e.g., based on information from the cloud quantum computing system 130) and quantum state information (e.g., based on information from the signaling hardware 204), and generates control signal and sequences for the quantum processor 206 based on the quantum machine instructions and quantum state information.

Control system 202 generates control information (e.g., a digital waveform) that is delivered to the signaling hardware 204 and converted to control signals 208 (e.g., analog waveforms) for delivery to the quantum processor 206. The digital control information can be generated based on quantum instructions, for example, to execute quantum logic operations, readout operations, or other types of control.

The control system 202 extracts qubit state information from qubit readout signals, for example, to identify the quantum states of qubit devices in the quantum processor 206 or for other purposes. For example, the control system 202 may receive the qubit readout signals (e.g., in the form of analog waveforms) from the signaling hardware 204, digitize the qubit readout signals, and extract qubit state information from the digitized signals.

In some implementations, the signaling hardware 204 can span multiple different temperature and noise regimes. For example, the signaling hardware 204 can include a series of temperature stages (e.g., 60 K, 3 K, 350 mK, 300 mK, 5 mK) that decrease between a higher temperature regime of the control system 202 and a lower temperature regime of the quantum processor 206. The quantum processor 206, and in some cases all or part of the signaling hardware 204, can be maintained in a controlled cryogenic environment. In some examples, the cryogenic environment can be provided by shielding equipment, cryogenic equipment, and other types of environmental control systems.

The example control system 202 shown in FIG. 2 includes a signal generator system, a program interface, a signal processor system and may contain additional or alternate components. In some instances, components of the control system 202 can operate in a room temperature regime, an intermediate temperature regime, or both. For example, the control system 202 can be configured to operate at much higher temperatures than are present in the environment of the quantum processor 206.

In some implementations, the tunable qubit devices 212 are housed between neighboring pairs of the other qubit devices 214 in a device array within the quantum processor 206. The quantum states of the respective qubit devices can be manipulated by control signals or read by readout signals generated by the control system 202 and the signaling hardware 204. The qubit devices can be controlled individually, for example, by delivering control signals 208 to the respective qubit devices. In some cases, a neighboring pair of qubit devices (e.g., tunable qubit device 212C and other qubit device 214A) is controlled jointly by delivering control signals to the tunable qubit device. In some cases, readout devices can detect the states of the qubit devices, for example, by interacting directly with the respective qubit devices.

In the example shown in FIG. 2, each tunable qubit device 212 has one or more tunable transition frequencies. The transition frequency is the energy level between any two adjacent energy levels in a qubit device. The transition frequency of a qubit device is tunable, for example, by application of an offset field. In particular, the transition frequencies of the tunable qubit devices 212 can be tuned by applying an offset field to the tunable qubit device. The offset field can be, for example, a magnetic flux bias, a DC electrical voltage, AC electrical voltage, or another type of field. In some implementations, the tunability of the tunable qubit devices 212 in the quantum processor 206 allows neighboring pairs of qubits to be selectively coupled on-demand to perform multi-qubit gates, to entangle neighboring pairs of qubits, or to perform other types of operations. The tunable qubit devices can have a high "on/off" ratio, which refers to the ratio of the effective coupling rate provided by control of the tunable qubit device. In one embodiment, each tunable qubit device can include a superconducting circuit loop including two Josephson junctions and a capacitor structure in parallel with the junctions.

In some implementations, the other qubit devices are implemented as fixed frequency qubit devices 214. In one embodiment, a fixed frequency qubit device 214 includes a Josephson junction connected in parallel with a capacitor structure. In this example, the transition frequency of a fixed-frequency qubit device 214 is based in part on the Josephson energy of the junction. In some implementations, the coupling of a fixed-frequency qubit device 214 with neighboring fixed-frequency qubit devices 214 allows multi-qubit gate operations to be performed. In this implementation, the frequency of the qubit is not tunable with an offset field, and the qubit devices are less sensitive to low frequency flux noise, yielding improved longer coherence times.

Returning to FIG. 2, in the example quantum processor 206 each of the qubit devices can be encoded with a single bit of quantum information. As described in regards to FIG. 1, each of the qubit devices has two eigenstates that are used as basis states $|0\rangle$ and $|1\rangle$, and each qubit device can transition between the basis states or exist as a superposition of the basis states. Generally, the two lowest energy levels (the ground state and first excited state) of each qubit device are defined as a qubit and used as basis states for quantum computation. In some examples, higher energy levels (e.g., a second excited state or a third excited state) are also defined by a qubit device, and may be used for quantum computation in some instances.

In some instances, the information encoded in the qubit devices of the quantum processor 206 can be processed by operation of the tunable qubit devices 212. For instance, input information can be encoded in the computational states or computational subspaces defined by some or all of the qubit devices in the quantum processor 206. The information can be processed, for example, by applying a quantum algorithm or other operations to the input information. The quantum algorithm may be decomposed as gates or instruction sets that are performed by the qubit devices over a series of clock cycles. Processing the information encoded in the qubit devices can produce output information that can be extracted from the qubit devices. The output information can be extracted, for example, by performing state tomography or individual readout operations. In some instances, the output information is extracted over multiple clock cycles or in parallel with the processing operations. In some aspects of operation, the control system 202 sends control signals 208 to the tunable qubit devices in the quantum processor 206 using the signaling hardware 204. The control signals can be configured to modulate, increase, decrease, or otherwise manipulate the transition frequencies of the tunable qubit devices 212.

In the example shown in FIG. 2, the control system 202 sends control signals 208 to the tunable qubit device 212C to generate interactions between the tunable qubit device 212C and individual nearest neighbor qubit devices. In particular, the control signals 208 can generate a first interaction 216A between the tunable qubit device 212C and the other qubit device 214A, a second interaction 216B between the tunable qubit device 212C and the other qubit device 214B, a third interaction 216C between the tunable qubit device 212C and the other qubit device 214C, a fourth interaction 216D between the tunable qubit device 212C and the other qubit device 214D, or a combination of them in series or in parallel.

As described previously, quantum algorithms include a set of quantum instructions (e.g. computations) that can be executed by the quantum cloud system. Broadly, a quantum instruction can alter the state of a qubit, encode the state of a qubit, measure the state of a qubit, etc. Within the context of this description, a quantum computation (e.g., those generated from a quantum algorithm) is executed by applying a quantum gate to a qubit. Quantum gates are the building blocks of the quantum algorithm and function similarly to logic gates in traditional computation systems and algorithms.

Further, quantum gates can be represented by unitary matrices in traditional quantum processing systems: a quantum gate which acts on j qubits is represented by a $2^j \times 2^j$ unitary matrix. Unlike classical logic gates, the number of qubits in the input and output of a quantum gate have to be equal. Mathematically, the action of a quantum gate on the state of a qubit is found by multiplying the vector representing the qubit state by the matrix representing the gate.

In practical terms, applying a quantum gate entails sending a specific set of signals to the control hardware of a qubit which induces a change in the state of the qubit. In one example embodiment, the control signals are configured to generate interactions that apply quantum gates on the quantum states (e.g., change, measure, etc.) of one or more of the qubit devices. For example, referring to FIG. 2, one or more of the control signals 208 generates an interaction that applies a parametrically activated two-qubit quantum gate to a pair of qubits defined by the tunable qubit device 212C and one or more of the other qubit devices 214. The control signals 208 may activate quantum gates by modulating a transition frequency of the tunable qubit device 212C, for example, at a modulation frequency. For instance, the modulation of the transition frequency over a specified time period can produce the unitary evolution associated with the quantum gate.

Figure 3:
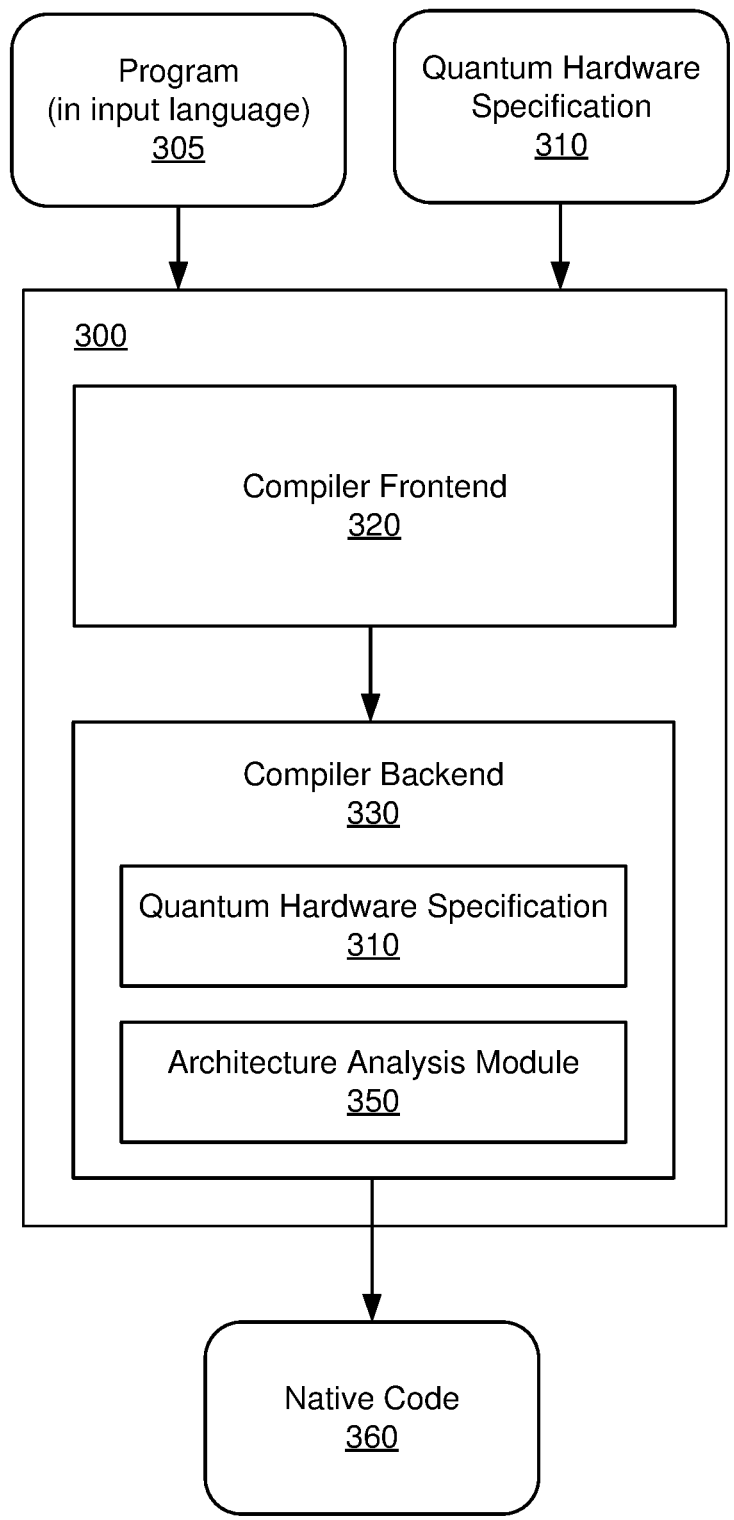
FIG. 3 is a flowchart illustrating the process of compiling a program for the quantum processing system, in accordance with an example embodiment.

FIG. 3 is a flowchart illustrating the process of compiling a program for the quantum processing system 200, in accordance with an example embodiment. As was mentioned previously in the description of FIG. 1, the quantum compilation module 300 takes in a program 305 and a quantum hardware specification 310 as input and produces native quantum code 360 in a target language (e.g., object code, machine code, etc.) so that the quantum processing system 200 can execute the program 305.

The program 305 is provided to the quantum compilation module 300. The program 305 comprises portions of a quantum algorithm that the classical processing system 500 has scheduled for execution on the quantum processing system 200. That is, a separate compiler may translate portions of the quantum algorithm into machine code for execution by the classical processing system 500 since the classical processing system 500 and the quantum processing system 200 have different computer architectures and thus have different compilation targets. In one embodiment, the program 305 may be written in the form of instructions from a quantum instruction set architecture or an intermediate representation language (e.g., Quil). In some embodiments, a quantum compilation module 300 may receive program code 305 directly from an application 112 of a client device 110 in the form of a quantum algorithm that is meant to be executed only on a quantum processor 206. In various embodiments, the program code may be received as a file, as streaming input, as user input, etc.

In addition to a program 305, the quantum compilation module 300 receives a quantum hardware specification 310 as input. The quantum hardware specification 310 includes information about the architecture and configuration of the quantum processor 206 and information related to current calibration settings of the quantum processing system 200. More specifically, the quantum hardware specification 310 provides intermediate information about the capabilities of a quantum processing system 200. The quantum compilation module 300 can adapt the program 305 to run on variants of different quantum architectures as long as it has the intermediate information related to operations that are available. Such intermediate information may include a number of qubits in the quantum processor 206, availability of quantum gates, types of qubits (e.g., superconducting, tunable, fixed, etc.), topology of the quantum processor 206 (i.e., how the qubits are connected), and coherence times of individual qubits. The quantum compilation module 300 uses this information to determine logical operations that can be executed using the quantum processing system 200. In some embodiments, the quantum hardware specification 310 additionally includes explicit information about operations supported by the qubits in the quantum processor 206. Thus, the quantum hardware specification 310 provides the quantum compilation module 300 with a compilation target for the program 305 (i.e., executable operations that are supported by the quantum processing system 200). Since the quantum hardware specification 310 may be input to the quantum compilation module 300 at the same time as a program 305, the quantum compilation module 300 can compile executable instructions in a target language (e.g., machine code) for any quantum processor 206, as long as operations needed to execute the program are available and can be determined from information included in the quantum hardware specification 310.

The quantum hardware specification 310 may be a configuration file that can be edited by a lab technician, physicist, system administrator, or other user who oversees the use of a quantum processing system 200. In some embodiments, the quantum hardware specification 310 configuration file may be automatically edited or updated by a computer, for example, after a recalibration process. Furthermore, in various embodiments, the configuration file itself may be automatically generated by a computer. In some embodiment, processes including recalibration can be fully automated. Although the example of FIG. 3 depicts only a single quantum hardware specification 310 provided as input to the quantum compilation module 300, in some embodiments, multiple such configuration files may be provided to the quantum hardware specification 310. A quantum hardware specification 310 may be updated when components of a quantum processing system 200 are recalibrated or when a new quantum processor 206 is installed in the quantum processing system 200. For example, recalibration may affect the accuracy of components that measure qubit values, in turn affecting the coherence times of individual qubits.

In various embodiments, the information of the quantum hardware specification 310 may be received by the quantum compilation module 300 in the form of a file, received as streamed input, or may be hardcoded into a field-programmable gate array (FPGA) or an application-specific integrated circuit (ASIC). For example, a quantum hardware specification 310 may include a file of current calibration information about the quantum processing system 200 and may include accessible hardcoded information about the specifications of the quantum processing system.

The quantum compilation module 300 includes a compiler frontend 320 and a compiler backend 330. The compiler frontend 320 may perform various functions including parsing, lexical analysis, semantic analysis, and syntax analysis of the program 305. The compiler frontend 320 may also optimize the program 305. Optimizations performed by the compiler frontend 320 include simplifications of logic within the program 305, and are independent of the architecture of the quantum processing system 200 as described by the quantum hardware specification 310. For example, the compiler frontend 320 might perform a math transformation on an expression x+1−1 so that it is instead represented by the value x. The compiler frontend may also perform other optimizations such as removing unreachable code and reordering program instructions.

The compiler backend 330 performs machine-specific instruction optimization and instruction scheduling. The compiler backend 330 receives a parsed and logically optimized version of the program 305 from the compiler frontend 320. The compiler backend 330 uses information from the quantum hardware specification 310 to determine quantum operations that are available for execution on the quantum processor 206. By optimizing the program 305 and scheduling instructions according to the quantum hardware specifications 310 for individual quantum machines, the compiler backend 330 can produce machine dependent optimizations of the program code that will execute on the differently configured quantum processors 206.

The compiler backend 330 includes an architecture analysis module 350. The architecture analysis module 350 performs machine-specific optimizations and instruction scheduling. That is, the architecture analysis module 350 generates instructions (e.g., in machine code) for execution by a particular quantum processing system 200 that has a configuration described by the quantum hardware specification 310. Components of the architecture analysis module 350 may facilitate qubit routing, qubit lifetime analysis, gate realization, and instruction scheduling.

Figure 4:
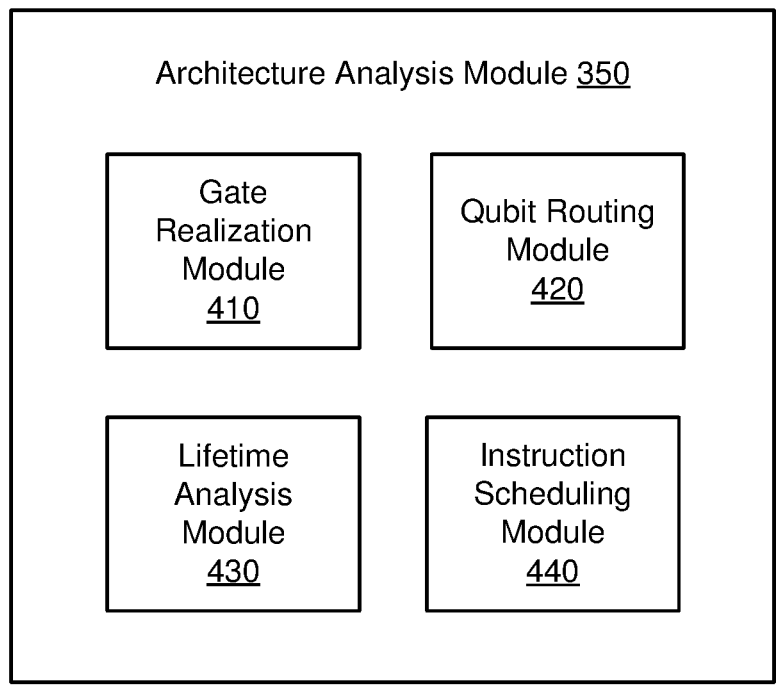
FIG. 4 is a high-level block diagram of an architecture analysis module, in accordance with an example embodiment.

FIG. 4 is a high-level block diagram of an architecture analysis module 350, in accordance with an example embodiment. Generally, the components of the architecture analysis module 350 convert a sequence of gates used in a program 305 into an equivalent or near equivalent sequence of gates that are executable by the quantum processing system 200. (Here a near equivalent sequence of gates refers to a sequence of gates that while not exactly equivalent maintain the integrity of the program to be run such that a useful result can be obtained.) The architecture analysis module 350 includes a gate realization module 410, a qubit routing module 420, a lifetime analysis module 430, and an instruction scheduling module 440. The functions performed by the various components of the architecture analysis module 350 may vary in different embodiments. The architecture analysis module 350 may contain more, fewer, or different components than those shown in FIG. 4, and the functionality of the components as described herein may be distributed differently from the description herein.

The gate realization module 410 logically translates between quantum gates that are used in the program 305 and quantum gates that may be applied to qubits on the physical quantum processor 206. Quantum gates that may be applied to qubit devices on the quantum processor 206 may be listed in the quantum hardware specification 310. To reduce the set of gates used in the program 305 to a subset of the gates available to the quantum processor 206, the gate realization module may determine logical combinations and parameterizations of the available quantum gates that can be applied to achieve equivalent or near equivalent operations to the quantum gates used in the program 305. This process of either exactly decomposing or approximating quantum gates helps to make programs 305 portable across different quantum processing systems 200. A program 305 can include any quantum gates as long as the processor 206 for which the quantum compilation module 300 compiles the program 305 can execute quantum gates that can be combined to achieve the same or approximately the same operations as the quantum gates included in the program 305.

The qubit routing module 420 performs qubit routing as a part of the compilation process. Qubit routing transfers qubit states between qubit devices (e.g. devices 212 and 214 as shown in FIG. 2) on the quantum processor 206. This allows qubit states of non-adjacent qubits to be moved into positions such that the states can interact with each other (i.e., qubit values represented by adjacent qubit devices may be able to interact with each other, such as through quantum entanglement). In various qubit topologies, it may be the case that a qubit cannot interact directly with every other qubit on the quantum processor 206. For example, a quantum processor 206 may include four qubit devices physically connected in a square such that each qubit device may interact with its two adjacent qubit devices (e.g., via the application of quantum gates that cause interaction between adjacent qubit states), but not with the qubit device at the opposite corner of the square. Adjacent qubit devices may be qubit devices that can interact directly with each other. The qubit routing module 420 schedules the application of quantum gates that route the qubit states. Routing the state of a qubit involves transferring the state representation from one qubit device to another qubit device within the quantum processor 206. The qubit routing module 420 moves qubit states into neighboring positions so that they can interact with each other as specified in a program 305. For example, a quantum program 305, written in a language such as Quil, may specify operations between qubits for which an analogous qubit configuration does not physically exist in the particular quantum processor 206. The qubit routing module 420 moves qubit states among the qubit devices on the quantum processor 206 to make interactions between the qubit states possible. Instructions for routing qubit states among qubit devices for a program 305 may be included in native code 360 when it is provided to the quantum processing system 200 for execution. Such instructions may include when to route qubit states and may identify qubit devices to which qubit states should be routed.

In some embodiments, the qubit routing module 420 performs qubit allocation rather than qubit routing. Qubit allocation may occur when there are no conflicting allocations and when it is convenient to do a logical physical mapping of a qubit to a particular qubit device. For example, if a quantum program specifies particular qubit devices for representing certain qubit states, but the specified qubit devices cannot interact with each other, the qubit routing module 420 may assign the qubit state information to different qubit devices that are able to interact.

The lifetime analysis module 430 assigns physical qubit devices to represent logical qubits in the program 305. In particular, the lifetime analysis module 430 may use information about the coherence time of individual qubit devices, as provided by the quantum hardware specification 310. That is, the lifetime analysis module 430 may prioritize qubit devices with longer coherence times for executing instructions. For example, a program 305 may define two qubits and may include operations to be performed by the two qubits. If such a program 305 is compiled by the quantum compilation module 300 into instructions for a quantum processing system 200 with four qubit devices, then the lifetime analysis module 430 may select the two qubit devices with the longest coherence times of the four qubit devices for performing the operations. In this way, the lifetime analysis module 430 may use the information from the quantum hardware specification 310 to ensure that qubits with longer coherence times are used to perform operations in a program 305.

In some embodiments, the lifetime analysis module 430 also assigns physical qubit devices to represent logical qubits in the program 305 such that higher fidelity gates perform the operations in a program 305. Fidelity is a metric for the performance of a quantum gate. A measurement of fidelity is obtained by comparing the actual gate with an ideal gate. "Ideal" operation of a gate refers to logical gate operation as would occur with no system errors or dissipation of the system. Examples of dissipation are dissipation/dephasing (T1/T2) processes which result in an irreversible loss information about the qubit state and thus lower the gate fidelity. Other examples of dissipation are leakage of energy to a non-computational subspace of the quantum processing system 200, and leakage of energy to other qubit devices which are not under the gate operation. Measures of fidelity for different gates on the quantum processor 206 can be provided as part of the quantum hardware specification 310, for example, in the form of calibration data.

The instruction scheduling module 440 schedules instructions for the individual qubits on the processor 206. A quantum processing system 200 can execute instructions for multiple qubits simultaneously. During compilation, the instruction scheduling module 440 generates a schedule for each qubit device. A schedule may include quantum operations and a time at which each operation should be performed and identification of the qubit device that should perform the operation. In one embodiment, the instruction scheduling module 440 generates such a schedule for an entire program 305. The schedule may form a part of the native code 360 that is provided to the quantum processing system 200 for execution.

Figure 5:
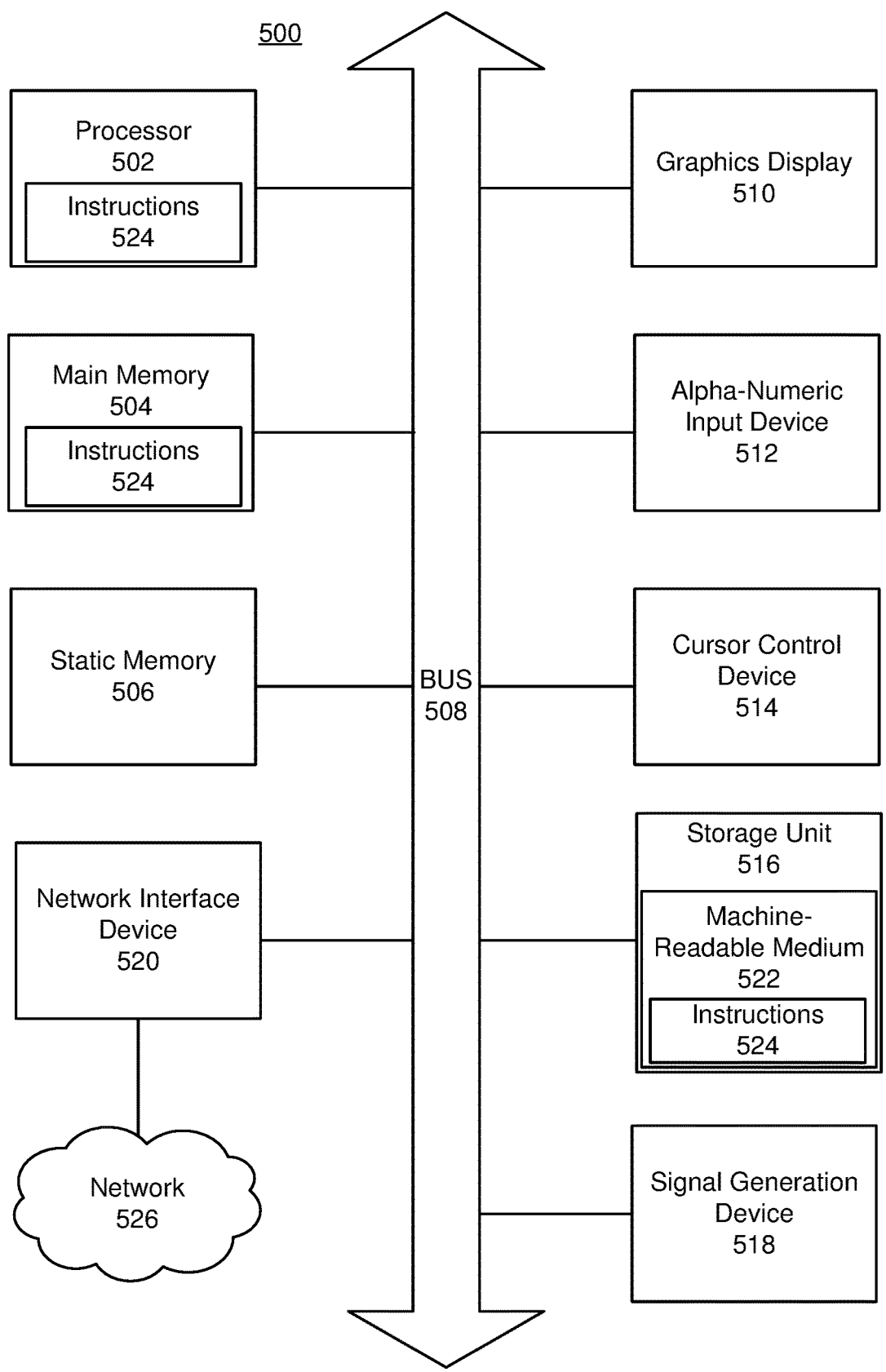
FIG. 5 is an illustration of a classical processing system, in accordance with an example embodiment.

FIG. 5 is a block diagram illustrating components of an example classical processing system 500 that facilitates determining the result of a quantum algorithm in the quantum cloud system of FIG. 1. Additionally, the classical processing system 500 is capable of reading and executing instructions from a machine-readable medium.

As an example, FIG. 5 shows a diagrammatic representation of the classical processing system 500 of FIG. 1. The classical processing system 500 can generate algorithm instructions using the classical processors 502. Further, the classical processing system 500 can be used to execute the classical instructions 524 of the algorithm instructions. In alternative embodiments, the classical processing system 500 operates as a standalone device or a connected (e.g., networked) device that connects to the network system. In the illustrated embodiment, the classical processing system 500 may be a server computer, capable of executing the classical instructions 524 (sequential or otherwise) that specify actions to be taken by the classical processing system 500 to determine the result of the quantum algorithm.

The example classical processing system 500 includes one or more processing units (hereinafter referred to as processor 502). The processor 502 is, for example, a central processing unit (CPU), a graphics processing unit (GPU), a digital signal processor (DSP), a controller, a state machine, one or more application specific integrated circuits (ASICs), a field programmable gate array (FPGA), one or more radio-frequency integrated circuits (RFICs), or any combination of these. The processors 502 can generate control information, for example, based the determined algorithm instructions (e.g., a set of quantum gates, offset field signals, quantum simulation parameters, etc.) to be performed by the quantum computing system 200 or quantum virtual machine module 160.

The classical processing system 500 also includes a main memory 504. The computer system may include a storage unit 516. The processor 502, memory 504, and the storage unit 516 communicate via a bus 508. In addition, the classical computer processing system 500 can include a static memory 506.

Additionally the classical processing system 500 includes a storage unit 516. The storage unit 516 includes a machine-readable medium 522 on which the classical instructions 524 embodying any one or more of the methodologies or functions described herein can be stored. For example, the classical instructions 524 may include the functionalities of modules and systems of the quantum cloud system 130 described in FIG. 1. The classical instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

In various embodiments, the memory systems can include, for example, a random access memory (RAM), a storage device (e.g., a writable read-only memory (ROM) or others), a hard disk, or another type of storage medium. The memory can include various forms of memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks.

In some embodiments, the classical processing system 500 may also include a graphics display 510 (e.g., to drive a plasma display panel (PDP), a liquid crystal display (LCD), or a projector), alphanumeric input device 512 (e.g., a keyboard), a cursor control device 514 (e.g., a mouse, a trackball, a joystick, a motion sensor, or other pointing instrument), and a network interface device 520, which also are configured to communicate via the bus 508.

The classical processing system includes a signal generation device 518. The signal generation device can include, radio frequency (RF) or microwave (μW) generators, radio frequency (RF) or microwave (μW) receivers, DC sources, or other type of radio frequency (RF) or microwave (μW) devices.

In these implementations, radio frequency (RF) or microwave (μW) generators and DC sources of the signal generation devices 518, can each generate control signals based on control information provided by the processors 502. The control signals can be delivered to the quantum processing system 200 by the signal generation devices 518, for example, and interact with circuit devices in the quantum processor 506. In some implementations, radio frequency (RF) or microwave (μW) receivers in the signaling hardware 518 can receive and process signals from the quantum processor 206. For example, receivers in the signaling hardware 518 can include a digitizer, a microwave source, and other types of signal processing components. The receivers of the signaling hardware 518 can process (e.g., digitize, or otherwise process) the signals from the quantum processor 206 and provide the processed information to the processors 502. The processors 502 can extract data to identify the quantum states of qubits in the quantum processor 206 or for other purposes.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

In some instances, the classical processing system 500 operates based on a clock cycle or another type of synchronization scheme. For example, the synchronization scheme can be based on a quantum algorithm or quantum processing task. The quantum algorithm or quantum processing task may be expressed as a sequence of instructions corresponding to quantum gates, readouts, or other operations on the qubit devices, and a subset of the instructions can be executed on each clock cycle. In some instances, on each clock cycle, the classical processing system 500 generates control signals to implement a subset of instructions, control signals are delivered to the quantum processing system 200, and qubit readout signals are delivered to the classical processing system 500. The control signals delivered on each clock cycle can be configured, for example, based on the sequence of instructions, based on readout signals from a previous cycle, quantum error correction operations, error matching calculations, other information, or a combination of these.

In some embodiments, client devices may be similarly configured to the classical processing system 500. That is, the client devices can include any elements of the classical processing system, or any additional element, such that the client devices are able to send quantum algorithms or instructions to the quantum cloud system and receive the results of quantum algorithms in response.

Although the detailed description contains many specifics, these should not be construed as limiting the scope of the invention but merely as illustrating different examples and aspects of the invention. It should be appreciated that the scope of the invention includes other embodiments not discussed in detail above. For example, qubits in a quantum processor 206 may be configured in various manners other than that shown in FIG. 2. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for compiling a quantum program for execution on a quantum processing system, the method comprising:
   receiving the quantum program;
   receiving, separately from the quantum program, a specification comprising a description of a hardware configuration of the quantum processing system, and calibration information about the current state of the quantum processing system; and
   compiling the quantum program, by a computer processor, using the specification, to generate executable instructions in a target language for executing on the quantum processing system to perform operations described in the quantum program.

2. The computer-implemented method of claim 1, further comprising executing the generated executable instructions on the quantum processing system.

3. The computer-implemented method of claim 1, wherein the specification comprises identification of types of qubit devices included in the quantum processing system.

4. The computer-implemented method of claim 1, wherein the specification comprises a number of qubit devices included in the quantum processing system.

5. The computer-implemented method of claim 1, wherein the specification comprises a description of a topology of the qubit devices included in the quantum processing system.

6. The computer-implemented method of claim 1, wherein the specification comprises a set of quantum operations that can be executed by the quantum processing system.

7. The computer-implemented method of claim 1, wherein compiling the quantum program further comprises:
identifying a sequence of applications of quantum gates defined by the program;
determining that the existing configuration of the quantum processing system includes quantum gates that can carry out an equivalent or near equivalent sequence of applications of quantum gates; and
determining an equivalent or near equivalent sequence of quantum gates that can be applied to the qubit devices of the quantum processing system.

8. The computer-implemented method of claim 1, wherein compiling the quantum program further comprises:
identifying operations in the program that involve interactions between non-adjacent qubit devices; and
generating instructions for routing qubit states between devices such that the qubit states from the non-adjacent qubit devices are transferred to adjacent qubit devices.

9. The computer-implemented method of claim 1, wherein compiling the quantum program further comprises:
assigning operations to qubit devices giving priority to qubit devices with longer coherence times.

10. The computer-implemented method of claim 1, wherein compiling the quantum program further comprises:
generating, for each qubit device on the quantum processing system, a schedule of operations for execution.

11. The computer-implemented method of claim 1, wherein compiling the quantum program further comprises:
assigning operations to gates giving priority to gates with higher gate fidelities.

12. A quantum cloud system comprising:
one or more computer processors for executing computer program instructions; and
a non-transitory computer-readable storage medium storing instructions executable to compile a quantum program for execution on a quantum processing system, the instructions, when executed, causing the one or more processors to:
receive the quantum program;
receive, separately from the quantum program, a specification comprising a description of a hardware configuration of the quantum processing system, and calibration information about the current state of the quantum processing system; and
compile the quantum program, using the specification, to generate executable instructions in a target language for executing on the quantum processing system to perform operations described in the quantum program.

13. The system of claim 12, the instructions, when executed, further causing the one or more processors to execute the generated executable instructions in a target language on the quantum processing system.

14. The system of claim 12, wherein the specification comprises identification of types of qubit devices included in the quantum processing system.

15. The system of claim 12, wherein the specification comprises a number of qubit devices included in the quantum processing system.

16. The system of claim 12, wherein the specification comprises a description of the topology of the qubit devices included in the quantum processing system.

17. The system of claim 12, wherein the specification comprises a set of quantum operations that can be executed by the quantum processing system.

18. The system of claim 12, wherein instructions that, when executed, cause the one or more processors to compile the quantum program further include instructions that, when executed, cause the one or more processors to:
identify a sequence of applications of quantum gates defined by the program;
determine that the existing configuration of the quantum processing system includes quantum gates that can carry out an equivalent sequence of applications of quantum gates; and
determine an equivalent or near equivalent sequence of quantum gates that can be applied to the qubit devices of the quantum processing system.

19. The system of claim 12, wherein instructions that, when executed, cause the one or more processors to compile the quantum program further includes instructions that, when executed, cause the one or more processors to:
identify operations in the program that involve interactions between non-adjacent qubit devices; and
generate instructions for routing qubit states between devices such that the qubit states from the non-adjacent qubit devices are transferred to adjacent qubit devices.

20. The system of claim 12, wherein instructions that, when executed, cause the one or more processors to compile the quantum program further includes instructions that, when executed, cause the one or more processors to:
assign operations to qubit devices giving priority to qubit devices with longer coherence times.

* * * * *